United States Patent
Akieda et al.

(10) Patent No.: US 9,453,975 B2
(45) Date of Patent: Sep. 27, 2016

(54) CLIP, OPTICAL MODULE, AND OPTICAL CONNECTOR

(71) Applicant: FUJITSU COMPONENT LIMITED, Tokyo (JP)

(72) Inventors: Shinichiro Akieda, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/856,722

(22) Filed: Sep. 17, 2015

(65) Prior Publication Data

US 2016/0091670 A1 Mar. 31, 2016

(30) Foreign Application Priority Data

Sep. 30, 2014 (JP) ................................. 2014-201657

(51) Int. Cl.
*G02B 6/36* (2006.01)
*G02B 6/38* (2006.01)
*G02B 6/32* (2006.01)
*G02B 6/40* (2006.01)

(52) U.S. Cl.
CPC .............. *G02B 6/3879* (2013.01); *G02B 6/32* (2013.01); *G02B 6/387* (2013.01); *G02B 6/3821* (2013.01); *G02B 6/403* (2013.01)

(58) Field of Classification Search
CPC ............................ G02B 6/3821; G02B 6/3879
See application file for complete search history.

(56) References Cited

U.S. PATENT DOCUMENTS

| | | | | |
|---|---|---|---|---|
| 6,095,695 A * | 8/2000 | Ohtsuka | ............... | G02B 6/3825 385/134 |
| 6,227,721 B1 * | 5/2001 | Naito | ................... | G02B 6/3877 385/78 |
| 6,293,708 B1 * | 9/2001 | Ohtsuka | ............... | G02B 6/3825 385/62 |
| 7,182,522 B2 * | 2/2007 | Sasaki | ................... | G02B 6/389 385/53 |
| 7,404,680 B2 * | 7/2008 | Ono | ...................... | G02B 6/4292 385/14 |
| 8,104,973 B2 * | 1/2012 | Howard | ............... | G02B 6/3825 385/55 |
| 8,485,735 B2 * | 7/2013 | Childers | .............. | G02B 6/3834 29/464 |
| 8,678,667 B2 * | 3/2014 | Koreeda | .............. | G02B 6/3882 385/59 |
| 8,740,473 B2 * | 6/2014 | Katoh | .................. | G02B 6/3885 385/53 |
| 9,213,150 B2 * | 12/2015 | Matsui | ................... | G02B 6/389 |
| 2008/0226228 A1 * | 9/2008 | Tamura | ................ | G02B 6/4214 385/33 |
| 2009/0245736 A1 * | 10/2009 | Ahadian | ............. | G02B 6/4292 385/92 |
| 2010/0008630 A1 * | 1/2010 | Marrapode | .......... | G02B 6/4292 385/78 |
| 2012/0027359 A1 * | 2/2012 | Katoh | .................. | G02B 6/3885 385/78 |
| 2013/0216190 A1 * | 8/2013 | Haley | .................. | G02B 6/3885 385/79 |
| 2015/0185423 A1 * | 7/2015 | Matsui | ................... | G02B 6/389 385/77 |
| 2016/0091670 A1 * | 3/2016 | Akieda | ..................... | G02B 6/32 385/78 |

FOREIGN PATENT DOCUMENTS

JP 2011-075814 4/2011

* cited by examiner

*Primary Examiner* — Rhonda Peace
(74) *Attorney, Agent, or Firm* — IPUSA, PLLC (57) ABSTRACT

A clip for keeping a first ferrule and a second ferrule in contact with each other includes a base member, one or more spring sections formed at the base member and configured to apply an elastic force to the first ferrule in a contact direction in which the first ferrule and the second ferrule come in contact with each other, and one or more engaging sections formed at the base member and configured to have higher rigidity in the contact direction than in other directions, wherein the engaging sections are configured to engage with the second ferrule.

10 Claims, 12 Drawing Sheets

CLIP, OPTICAL MODULE, AND OPTICAL CONNECTOR

BACKGROUND OF THE INVENTION

1. Field of the Invention

The disclosures herein relate to ferrule clips and optical connectors.

2. Description of the Related Art

A recent increase in the volume of optical communication has resulted in a demand for increased packaging density of optical connectors. A small-size optical connector of a QSFP (Quad Small Form-Factor Pluggable) type, for example, has both an MT (mechanically transferable) ferrule that allows plural optical fibers or the like to be connected in a lump and a lens ferrule that is tailored to high packaging density for the MT ferrule. The MT ferrule and the lens ferrule are brought into fact-to-face contact with each other so as to establish a connection between an optical cable coupled to the MT ferrule and an optical waveguide coupled to the lens ferrule.

The condition of the connection between the MT ferrule and the lens ferrule (which may be referred to simply as "ferrules" when referring to both an MT ferrule and a lens ferrule together) affects the efficiency of optical transmission. In consideration of this, the ferrules are aligned by use of guide pins or the like, and are fixed by use of a ferrule clip while the ferrules are in fact-to-face contact with each other.

An optical connector has one end thereof inserted into an electronic device or the like and the other end thereof from which an optical cable extends outwardly. With such a configuration, there may be a risk of the optical cable being pulled inadvertently. A ferrule clip may have a pair of spring members that are arranged to clip an MT ferrule and a lens ferrule together. With such a ferrule clip, the pulling of the optical cable causes the MT ferrule to be urged in such a direction as to be disconnected from the lens ferrule.

However, no mechanism is present to regulate the movement of the MT ferrule when the MT ferrule is urged in the disconnecting direction. Upon the optical cable being pulled, thus, the MT ferrule has a risk of moving relative to the lens ferrule, resulting in a drop in the efficiency of optical transmission.

It may be preferable to provide a ferrule clip and an optical connector that can maintain a connection between a first ferrule and a second ferrule even when an external force is applied.

[Patent Document 1] Japanese Laid-open Patent Publication No. 2011-075814

SUMMARY OF THE INVENTION

It is a general object of the present invention to provide a clip and an optical connector that substantially obviate one or more problems caused by the limitations and disadvantages of the related art.

According to an embodiment, a clip for keeping a first ferrule and a second ferrule in contact with each other includes a base member, one or more spring sections formed at the base member and configured to apply an elastic force to the first ferrule in a contact direction in which the first ferrule and the second ferrule come in contact with each other, and one or more engaging sections formed at the base member and configured to have higher rigidity in the contact direction than in other directions, wherein the engaging sections are configured to engage with the second ferrule.

According to an embodiment, an optical module includes a first ferrule, a second ferrule, and a clip configured to keep the first ferrule and the second ferrule in contact with each other, wherein the clip includes a base member, one or more spring sections formed at the base member and configured to apply an elastic force to the first ferrule in a contact direction in which the first ferrule and the second ferrule come in contact with each other, and one or more engaging sections formed at the base member and configured to have higher rigidity in the contact direction than in other directions, wherein the engaging sections are configured to engage with the second ferrule.

According to an embodiment, an optical connector includes a case and an optical module disposed in the case, wherein the optical module includes a first ferrule, a second ferrule, and a clip configured to keep the first ferrule and the second ferrule in contact with each other, wherein the clip includes a base member, one or more spring sections formed at the base member and configured to apply an elastic force to the first ferrule in a contact direction in which the first ferrule and the second ferrule come in contact with each other, and one or more engaging sections formed at the base member and configured to have higher rigidity in the contact direction than in other directions, wherein the engaging sections are configured to engage with the second ferrule.

According to at least one embodiment, the condition that the first ferrule and the second ferrule are in face-to-face contact with each other is maintained even when an external force is applied.

BRIEF DESCRIPTION OF THE DRAWINGS

FIGS. 8A and 85 are perspective views of a ferrule clip according to the further embodiment;

DESCRIPTION OF THE PREFERRED EMBODIMENTS

In the following, non-limiting embodiments of the invention will be described with reference to the accompanying drawings.

In illustrations provided in the drawings, the same or corresponding members or elements are referred to by the same or corresponding numerals, and duplicate descriptions thereof will be omitted. Further, the drawings are not provided for the purpose of illustrating size ratios between members or elements unless otherwise specified. Specific sizes may be determined by those skilled in the art by referring to the non-limiting embodiments that will be described hereinafter.

Further, the embodiments that will be described hereinafter are examples only that do not limit the invention. Features and combinations thereof described in these embodiments may not necessarily be essential to the invention.

In the following description, the direction indicated by arrows X1 and X2 is referred to as a face-to-face-contact direction. The direction indicated by arrows Y1 and Y2, perpendicular to the face-to-face contact direction, and in-plane with the surface of a base part 71 is referred to as a width direction. The direction perpendicular to both the face-to-face-contact direction and the width direction is referred to as a height direction.

Figure 1:
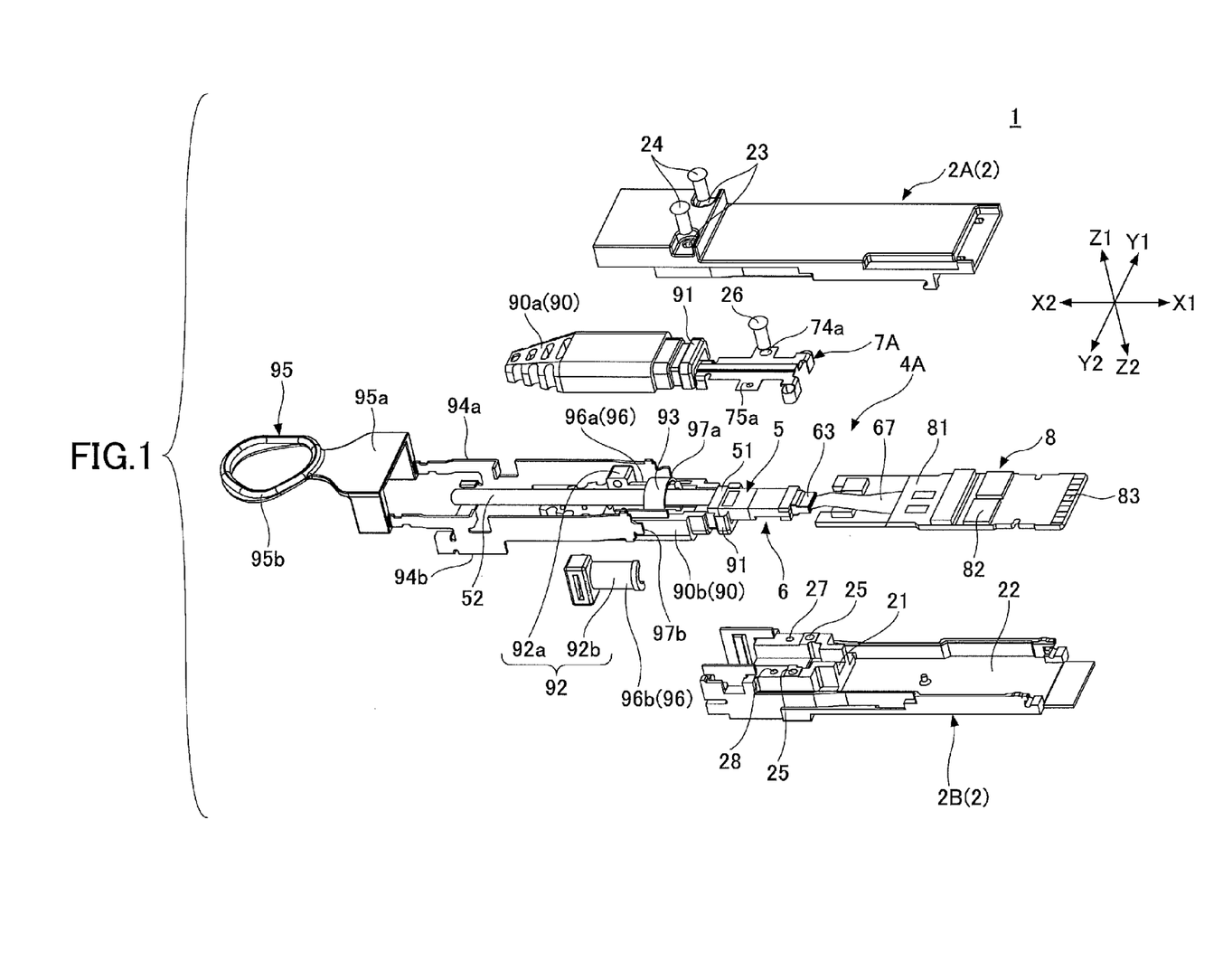
FIG. 1 is an exploded perspective view of an optical connector according to an embodiment.

FIG. 1 is an exploded perspective view of an optical connector 1 according to an embodiment. The optical connector 1 is a small-size optical connector of the QSFP type having a high packaging density.

The optical connector 1 includes a case 2, an optical module 4A, a printed circuit board 8, a cable boot 90, and a pull tab 95. The optical connector 1 may be employed in the Ethernet (registered trademark), for example, and may be inserted into and attached to an electronic apparatus (not shown) such as a computer or the like. In FIG. 1, the direction indicated by the arrow X1 shows a direction in which the optical connector 1 is inserted into the electronic apparatus. In the following, the X1 direction will be referred to as an insertion direction.

The case 2 includes an upper case part 2A and a lower case part 2B. The upper case part 2A has pass holes 23 through which screws 24 pass, respectively. The lower case part 25 has thread holes 25 to which screws 24 are threadably attached, respectively. The screws 24 are made to pass through the pass holes 23, and are threadably attached to the thread holes 25, such that the upper case part 2A and the lower case part 2B are integrated to form the case 2.

The case 2 has the optical module 4A, the printed circuit board 8 and the cable boot 90 disposed therein.

The optical module 4A includes an MT ferrule 5, a lens ferrule 6 and a ferrule clip 7A.

The MT ferrule 5 has an optical cable 52 connected thereto. The lens ferrule 6 has an optical flexible waveguide 67 connected thereto. The MT ferrule 5 and the lens ferrule 6 are brought into face-to-face contact with each other, so that the optical cable 52 and the optical flexible waveguide 67 are optically coupled to each other.

The ferrule clip 7A serves to maintain the MT ferrule 5 and the lens ferrule 6 in a face-to-face-contact condition. The ferrule clip 7A also serves to fixedly mount the MT ferrule 5 and the lens ferrule 6 to the case 2. Details of the ferrule clip 7A will be described later.

The printed circuit board 8 includes a photoelectric conversion unit 81, an electronic component 82 and a connector unit 83.

The end of the photoelectric conversion unit 81 facing in the insertion direction is coupled to the connector unit 83 through the electronic component 82. The contact end (facing in the X2 direction) of the photoelectric conversion unit 81 for coupling with the optical module 4A is connected to the optical flexible waveguide 67.

The photoelectric conversion unit 81 includes a light emitting device and a light receiving device. The light receiving device converts light signals into electric signals as these light signals are transmitted to the photoelectric conversion unit 81 through the optical cable 52. The light emitting device converts electric signals into optical signals as these electric signals are transmitted to the photoelectric conversion unit 81 from the electronic apparatus.

The electronic component 82 drives the light emitting device and the light receiving device of the photoelectric conversion unit 81, and performs signal processing with respect to the transmitted and received signals. The connector unit 83 is an edge connector, which is coupled to a terminal of a connector socket when the optical connector 1 is mounted to the connector socket of an electronic apparatus.

The cable boot 90 serves to prevent the optical cable 52 from being detached from the optical module 4A (i.e., from the MT ferrule 5). The cable boot 90 includes a boot half 90*a* and a boot half 90*b* connected together. The optical cable 52 is disposed to pass through the cable boot 90.

The end of the cable boot 90 facing in the insertion direction has an engaging part 91. The engaging part 91 is engaged with the case 2 when the upper case part 2A and the lower case part 2B are fixedly connected.

The engagement of the engaging part 91 with the case 2 serves to prevent the cable boot 90 from moving in the X1 or X2 direction with respect to the case 2, i.e., from moving in the insertion or removal direction in which the optical connector 1 moves with respect to the electronic apparatus.

A sleeve 92 and a swage ring 93 are disposed in the cable boot 90. The sleeve 92 has the optical cable 52 passing therethrough.

The sleeve 92 includes a sleeve half 92*a* and a sleeve half 92*b*. The sleeve half 92*a* and the sleeve half 92*b* have tubular part halves 96*a* and 96*b*, respectively, which constitute a tubular part 96. When the sleeve half 92*a* and the sleeve half 92*b* are assembled, the optical cable 52 is tightly held in the tubular part 96 (i.e., the tubular part halves 96*a* and 96*b*).

The swage ring 93 is attached to the tubular part 96. The inner space of the tubular part 96 through which the optical cable 52 passes has a diameter slightly smaller than the diameter of the optical cable 52. The optical cable 52 is disposed in the sleeve 92. The swage ring 93 is then attached to the tubular part 96 and deformed by a force. With this arrangement, the optical cable 52 is fixed in the sleeve 92.

With the optical cable 52 being fixed in the sleeve 92, the optical cable 52 becomes integral with the sleeve 92. Further, the sleeve 92 is configured to engage with the cable boot 90.

The optical cable 52 extends outwardly from the optical connector 1, and is thus likely to be subjected to an external force. The optical cable 52 may receive a pulling force while the optical connector 1 is attached to the electronic apparatus, which could present a risk of detachment of the optical cable 52 from the optical module 4A.

In the employed arrangement, however, the optical cable 52 is integral with the sleeve 92 and the swage ring 93, and the sleeve 92 and the cable boot 90 are engaged with each other. The application of a pulling force to the optical cable 52 causes the pulling force to be transmitted through the sleeve 92 and the swage ring 93 to the cable boot 90. However, the engagement of the engaging part 91 with the case 2 prevents the movement of the cable boot 90. The application of the pulling force to the optical cable 52 thus does not result in the optical cable 52 being detached from the optical module 4A.

The pull tab 95 may be used to pull off the optical connector 1 from the electronic apparatus after the optical connector 1 is inserted into the electronic apparatus. The pull tab 95 includes a body 95a and a ring 95b. The body 95a includes arms 94a and 94b. The ring 95b is integral with the body 95a, and has a ring shape that allows a finger to be inserted therethrough.

The arms 94a and 94b extend in the insertion direction from the body 95a. The arms 94a and 94b are engaged with the case 2 such as to be able to move a predetermined distance relative to the case 2. The arms 94a and 94b have tips thereof on which unlocking clicks 97a and 97b are formed, respectively.

The electronic apparatus into which the optical connector 1 is inserted has a detachment preventing mechanism that prevents the optical connector 1 from mistakenly detached from the electronic apparatus. The unlocking clicks 97a and 97b serve to unlock the optical connector 1 from the detachment preventing mechanism.

In order to remove the optical connector 1 from the electronic apparatus, an operator inserts a finger into the ring 95b, and pulls the pull tab 95 in the X2 direction. In the following, the X2 direction is referred to as a removal direction. The pulling action as described above causes the body 95a and the arms 94a and 94b to move in the removal direction.

In response to the movement of the arms 94a and 94b having a predetermined movable range relative to the case 2, the unlocking clicks 97a and 97b also move a predetermined distance, thereby unlocking the optical connector 1 from the detachment preventing mechanism. Thereafter, the pull tab 95 continues to be pulled to cause the arms 94a and 94b to engage with the case 2, resulting in the case 2 being pulled off of the electronic apparatus.

In the following, the optical module 4A will be described in detail.

Figure 2:
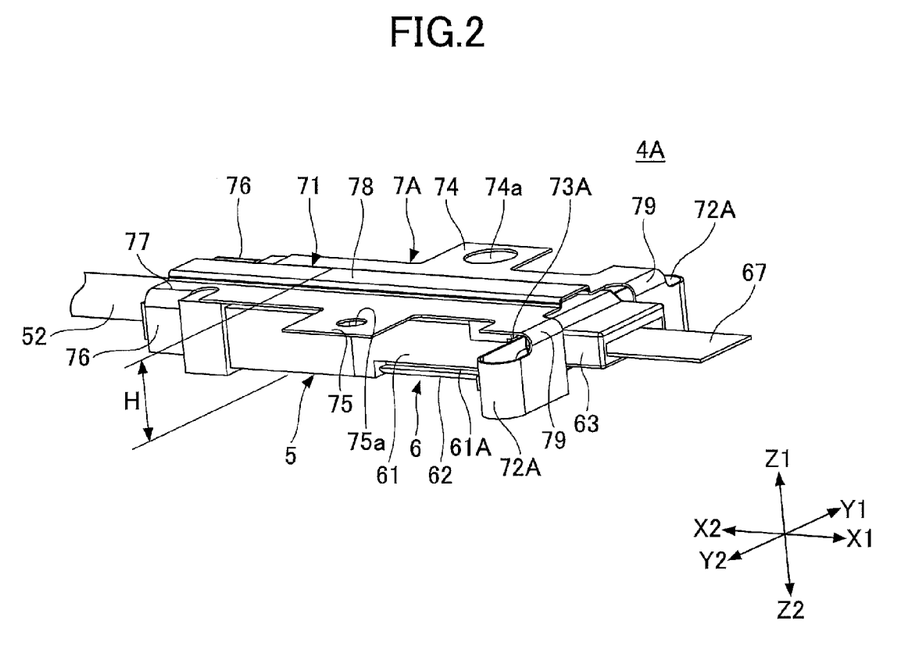
FIG. 2 is a perspective view of an optical module according to an embodiment.
Figure 3A:
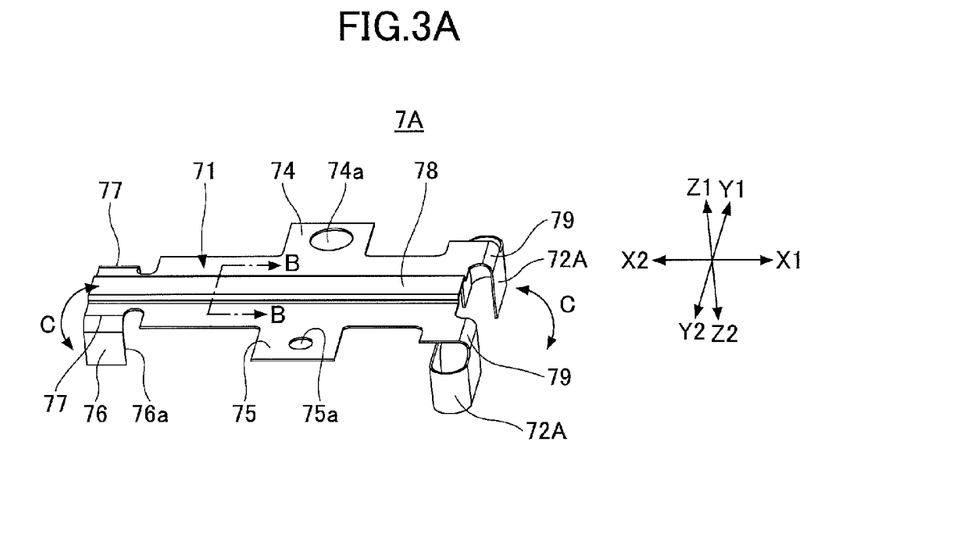
FIGS. 3A and 3B are perspective views of a ferrule clip according to an embodiment.
Figure 3B:
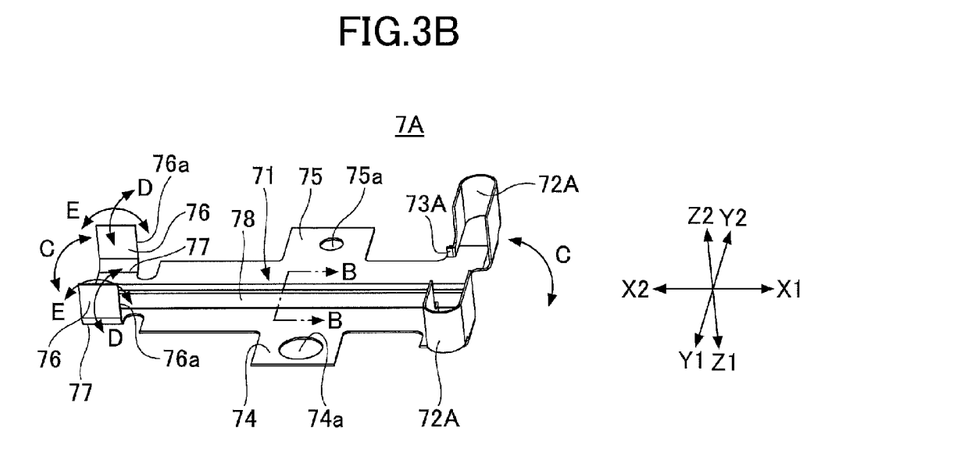
Figure 4:
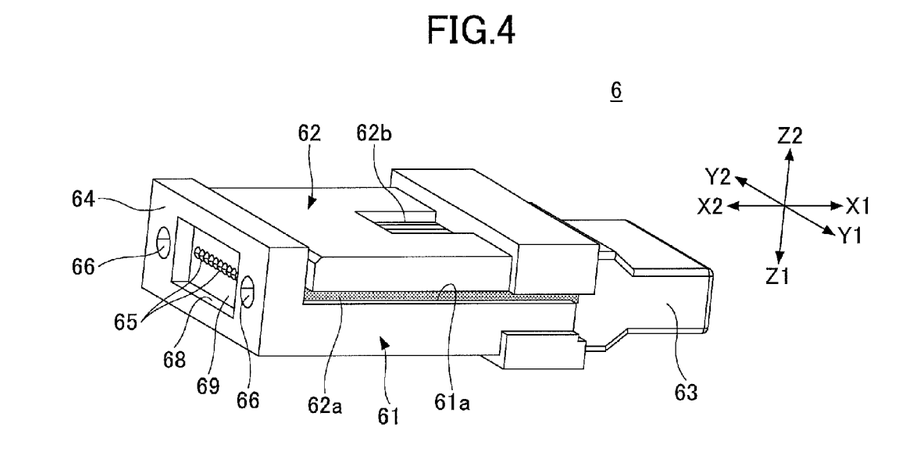
FIG. 4 is a perspective view of a lens ferrule.
Figure 5:
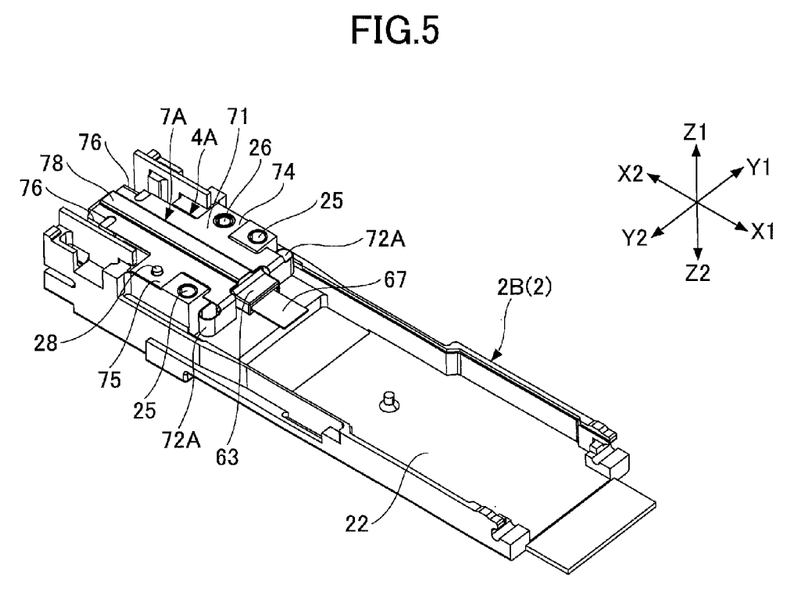
FIG. 5 is a perspective view of the optical module attached to a lower case part.

FIGS. 2 through 5 are drawings illustrating an embodiment of the optical module 4A. FIG. 2 is a perspective view of the optical module 4A. FIGS. 3A and 3B are perspective views of the ferrule clip 7A. FIG. 4 is a perspective view of the lens ferrule 6. FIG. 5 is a perspective view of the optical module 4A mounted on the lower case part 2B.

The MT ferrule 5 has an end thereof facing in the removal direction and coupled to the optical cable 52. The optical cable 52 is a multi-core optical cable including a plurality of optical fibers.

The end of the MT ferrule 5 facing in the insertion direction has a contact face that is brought into face-to-face contact with the lens ferrule 6. The contact face has a plurality of small holes in one-to-one correspondence with the optical fibers embedded in the optical cable 52.

The small holes are arranged in a line in the Y1-Y2 direction on the contact face. The small holes are formed such as to penetrate through the MT ferrule 5 in the X1-X2 direction. Each of the small holes has a corresponding one of the optical fibers of the optical cable 52 inserted therethrough. A tip of the optical fiber inserted in each small hole is aligned and flush with the contact face. The optical fibers are fixed by use of an adhesive agent after the alignment.

The contact face has guide-pin holes formed therein into which guide pins are inserted in order to align the MT ferrule 5 with the lens ferrule 6. The guide-pin holes are situated on both sides of the small holes arranged on the contact face.

The lens ferrule 6 includes a ferrule base 61, a ferrule cover 62 and a ferrule boot 63 as illustrated in FIG. 4.

The end of the lens ferrule 6 facing in the insertion direction is to be coupled to the optical flexible waveguide 67. The optical flexible waveguide 67 is a film-shape member formed of a resin material such as polyimide, on which a plurality of optical waveguide cores allowing the passage of light are arranged side by side.

At the end facing in the removal direction, the lens ferrule 6 has a contact face 64 that is brought into face-to-face contact with the MT ferrule 5 The contact face 64 has a recess 68, which has an end face 69 on which a plurality of lenses 65 are formed.

The lens ferrule 6 is formed of transparent resin such as PBS (polybutylene succinate). The lenses 65 are formed at the same time that the lens ferrule 6 is formed. The lenses 65 are hemisphere projections.

The positions of the lenses 65 have one-to-one correspondence with the positions of small holes (i.e., the ends of the optical fibers of the optical cable 52) formed in the MT ferrule 5. Further, the contact face 64 has guide-pin holes 66 formed therein near both ends of the array of lenses 65, into which guide pins are inserted in order to align the MT ferrule 5 with the lens ferrule 6.

The ferrule base 61 has a recess 61a formed therein. With the recess 61a formed therein, the ferrule base 61 has a letter-L shape in a lateral view (as viewed in the Y2 direction). The recess 61a receives the ferrule boot 63, the ferrule cover 62, and the optical flexible waveguide 67 disposed therein.

The ferrule boot 63 is disposed at the end of the lens ferrule 6 facing in the insertion direction. The ferrule boot 63 serves to protect the optical flexible waveguide 67, and has a passage hole formed therein through which the optical flexible waveguide 67 passes through.

In the process of assembling the lens ferrule 6, the optical flexible waveguide 67 is made to pass through the ferrule boot 63 in advance. The optical flexible waveguide 67 is disposed in the ferrule boot 63 such that a predetermined length of the tip of the optical flexible waveguide 67 projects from the tip of the ferrule boot 63. This projecting tip portion of the optical flexible waveguide 67 will hereinafter be referred to as an extension portion. An adhesive agent (e.g., ultraviolet curing adhesive) is pasted onto the portion of the recess 61a of the ferrule base 61 that is in proximity of the contact face 64.

The ferrule boot 63 and the optical flexible waveguide 67 are then placed in the recess 61a of the ferrule base 61. With the optical flexible waveguide 67 being placed in the recess 61a, the extension portion is situated on the adhesive that has been pasted onto the recess 61a. Since the ultraviolet curing adhesive is not yet cured at the time the optical flexible waveguide 67 is placed, the optical flexible waveguide 67 is still movable relative to the ferrule base 61.

Subsequently, the ferrule cover 62 is attached to the recess 61a, and the optical flexible waveguide 67 is aligned. The alignment of the optical flexible waveguide 67 in the face-to-face-contact direction is performed by causing the tip of the optical flexible waveguide 67 to be pressed against the back face (i.e., the face facing toward the X1 direction) of the contact face 64.

The alignment of the optical flexible waveguide 67 in the height direction is performed by utilizing the ferrule cover 62 that causes the optical flexible waveguide 67 to be pressed against the upper face of the recess 61a.

Further, the alignment of the optical flexible waveguide 67 in the width direction is performed by utilizing an alignment pin formed on the ferrule cover 62 that is brought into contact with the lateral side of the extension portion. Namely, the ferrule cover 62 is slid on the recess 61a in the Y1-Y2 direction to bring the lateral side of the extension portion in contact with the alignment pin formed on the recess 61a.

The alignment processes described above ensure that the optical flexible waveguide 67 be aligned with the lens ferrule 6. Upon the alignment processes being completed, ultraviolet light is shone on the ultraviolet curing adhesive. The fact that the lens ferrule 6 is made of transparent resin allows the ultraviolet curing adhesive to be exposed to ultraviolet light incident from outside the ferrule base 61 and the ferrule cover 62.

Since the ferrule base 61 and the ferrule cover 62 of the lens ferrule 6 are separate from each other before assembling, the alignment of the optical flexible waveguide 67 with the ferrule base (i.e., with the lenses 65) is easily performed with high accuracy.

Upon the alignment of the optical flexible waveguide 67 being completed, an adhesive agent 62a is poured into a window 62b of the ferrule cover 62, resulting in the ferrule base 61, the ferrule cover 62, and the ferrule boot 63 being adhered to each other.

In order to couple the optical cable 52 with the optical flexible waveguide 67, the contact face of the MT ferrule 5 and the contact face of the lens ferrule 6 are brought into face-to-face contact with each other. The established face-to-face contact ensures that the optical fibers of the optical cable 52 are optically coupled to the optical waveguide cores of the optical flexible waveguide 67. The lenses 65 in the lens ferrule 6 serves to prevent light from being scattered at the optical contact point between the optical fibers and the optical waveguide cores, thereby improving the efficiency of optical transmission.

The condition that the MT ferrule 5 and the lens ferrule 6 placed in face-to-face contact are pressed against each other by a sufficient force may need to be maintained in order to secure satisfactory contacts between the optical fibers and the optical waveguide cores. The ferrule clip 7A is attached to the MT ferrule 5 and the lens ferrule 6 to maintain the condition that the ferrules 5 and 6 are pressed against each other by a sufficient pressing force. In the following description, the MT ferrule 5 and the lens ferrule 6 may collectively be referred to as the ferrules 5 and 6.

In the following, a description will be given of the ferrule clip 7A.

The ferrule clip 7A includes a base 71, spring sections 72A, mounting sections 74 and 75, engaging sections 76 and a reinforcement section 78 as illustrated in FIGS. 3A and 3B. The ferrule clip 7A has a unitary, seamless structure that is made from a spring strip by press forming. The spring strip may be made of stainless (e.g., SUS304, SUS631), beryllium copper (C1720), phosphor bronze (C5210), or the like, which are not limiting examples.

The base 71 has a substantially rectangular shape which has a longitudinal direction thereof extending in the face-to-face-contact direction of the ferrules 5 and 6. The base 71 has the reinforcement section 78 formed therein. The reinforcement section 78 is formed as part of the base 71 at about the center of the base 71 in the width direction thereof to extend in the face-to-face direction.

The cross-section of the reinforcement section 78 taken along the B-B line illustrated in FIGS. 3A and 3B has a rectangular wave shape according to the present embodiment. The provision of the reinforcement section 78 in the flat base 71 serves to increase the efficient area size of the cross-section of the base 71, thereby increasing the rigidity of the base 71.

The reinforcement section 78 is formed to extend in the longitudinal direction of the base 71 (i.e., in the face-to-face-contact direction in which the ferrules 5 and 6 are pressed against each other). The provision of the reinforcement section 78 thus serves to prevent the base 71 from being warped in a direction indicated by an arrow C in FIGS. 3A and 3B. The present embodiment is directed to an example in which only one reinforcement section 78 is formed in the base 71. However, the number of reinforcement sections 78 is not limited to one, and a plurality of reinforcement sections may be formed to achieve the rigidity required of the base 71.

The spring sections 72A are formed on both lateral sides of the base 71 at the end thereof facing in the insertion direction. The spring sections 72A are formed by bending the relevant portions of the base 71 substantially perpendicularly in the Z2 direction at fold sections 79 and further bending the relevant portions into a letter-U shape in the width direction. With this arrangement, the relevant portions of the base 71 are provided with spring property in the face-to-face-contact direction. The fold sections 79 extend in the width direction of the base 71.

Pressure portions 73A are formed at the tips of the spring sections 72A, respectively. In the present embodiment, the pressure portions 73A extend in the removal direction from the tips of the spring sections 72A, respectively, as illustrated in FIG. 3B. Further, each of the pressure portions 73A is situated at the tip of the corresponding spring section 72A at the corner end thereof facing in the Z1 direction and situated toward the base 71.

The mounting sections 74 and 75 extend outwardly from the general center of the base 71 in the longitudinal direction. The mounting section 74 has a pass hole 74a through which a screw 26 (see FIG. 1) is made to pass through when fixedly mounting the optical module 4A to the lower case part 2B. The mounting section 75 has a swage hole 75a at which a boss 28 formed on the lower case part 2B is engaged and swaged when fixedly mounting the optical module 4A to the lower case part 2B.

The engaging sections 76 are formed as seamless parts of the base 71 on both lateral sides of the base 71 at the end thereof facing in the removal direction. The engaging sections 76 are formed by bending the engaging sections 76 in the Z2 direction relative to the base 71 at fold sections 77.

The fold sections 77 extend in the same direction as the face-to-face-contact direction of the ferrules 5 and 6. With this arrangement, the engaging sections 76 have higher rigidity (i.e., mechanical sturdiness) in the face-to-face-contact direction of the ferrules 5 and 6 than in other directions.

Specifically, the warping of the engaging sections 76 occurring upon an external force being applied in the direction indicated by an arrow E in FIG. 3B is smaller than the warping of the engaging sections 76 occurring upon an external force being applied in other directions (e.g., the direction indicated by an arrow D in FIG. 3B).

In the following, a description will be given of the method of assembling the optical module 4A and the method of assembling the optical connector 1.

In the process of assembling the optical module 4A, the MT ferrule 5 and the lens ferrule 6 are first brought in face-to-face contact with each other. In doing so, the guide pins are inserted into the guide-pin holes formed in the contact faces of the ferrules 5 and 6. The guide pins serve to align the MT ferrule 5 and the lens ferrule 6 with each other, so that the optical fibers of the optical cable 52 and the optical waveguide cores of the optical flexible waveguide 67 are optically coupled with each other with high precision.

Upon the ferrules 5 and 6 being placed in face-to-face contact, the ferrule clip 7A is attached to the ferrules 5 and 6. When the ferrule clip 7A is attached to the ferrules 5 and 6, the base 71 of the ferrule clip 7A receives a force being applied in the bending direction indicted by the arrow C in FIGS. 3A and 3B. The base 71 has a reinforced rigidity in the bending direction as a result of the provision of the reinforcement section 78.

The base 71 is not bent upon attaching the ferrule clip 7A to the ferrules 5 and 6, which ensures easy assembling of the optical module 4A. After being attached, further, the ferrules 5 and 6 are not separated from each other due to undesirable warping of the base 71.

The height of the spring sections 72A and the engaging sections 76 is the same as, or shorter than, the height of the ferrules 5 and 6. Consequently, a height H of the optical module 4A (see FIG. 2) is substantially the same as the height of the ferrules 5 and 6, which contributes to the thinning of the optical module 4A.

As illustrated in FIG. 2, with the ferrule clip 7A being attached to the ferrules 5 and 6, the spring sections 72A are in contact with the lens ferrule 6, and the engaging sections 76 are engaged with the MT ferrule 5.

When the engaging sections 76 are engaged with the MT ferrule 5, the side edges 76a of the engaging sections 76 facing in the X1 direction are in contact with the face of the broadened portion of the MT ferrule 5 facing in the X2 direction wherein the broadened portion has a broadened width in the Y direction. With this arrangement, the MT ferrule 5 and the lens ferrule 6 are tightly held between the engaging sections 76 and the spring sections 72A.

The pressure portions 73A of the spring sections 72A are configured to press the back end (i.e., back face) of the ferrule base 61 facing in the X1 direction. Namely, the restoration force of the spring sections 72A is applied only to the ferrule base 61.

In an alternative configuration having the pressure portions 73A pressed against the ferrule cover 62, the restoration force of the spring sections 72A would serve to remove, from the ferrule base 61, the ferrule cover 62 adhered to the ferrule base 61. Such a configuration having the pressure portions 73A pressed against the ferrule cover 62 may thus have a risk of the ferrule cover 62 being removed from the ferrule base 61.

The configuration of the present embodiment in which the pressure portions 73A are in contact only with the ferrule base 61 can avoid the separation of the ferrule cover 62 from the ferrule base 61.

Upon the ferrule clip 7A being attached to the ferrules 5 and 6, the engaging sections 76 are engaged with the rear end (i.e., back face) of the MT ferrule 5 facing in the X2 direction. The engaging sections 76 are engaged with the MT ferrule 5 such that the side edges 76a are urged against the back face of the MT ferrule 5.

As described above, the spring sections 72A are engaged with the lens ferrule 6, and the engaging sections 76 are engaged with the MT ferrule 5, which result in the ferrule clip 7A being attached to the ferrules 5 and 6, completing the assembling process of the optical module 4A.

Upon the optical module 4A being assembled, the photoelectric conversion unit 81 of the printed circuit board 8 is coupled to the optical flexible waveguide 67. The cable boot 90 (together with the sleeve 92 and the swage ring 93) and the pull tab 95 are then attached to the optical module 4A on the removal-direction side thereof.

The optical module 4A to which the printed circuit board 8, the cable boot 90, the pull tab 95 and so on are attached is then mounted to the case 2. The upper case part 2A and the lower case part 23 of the case 2 have a module mounting section 21 for mounting the optical module 4A and a board mounting section 22 for mounting the printed circuit board 8.

In order to mount the optical module 4A to the case 2, the optical module 4A together with the cable boot 90 are placed on the module mounting section 21 of the lower case part 2B. With the optical module 4A placed on the lower case part 2B, the pass hole 74a of the ferrule clip 7A fully overlaps a screw hole 27, and the boss 28 formed on the lower case part 2B passes through the swage hole 75a.

Subsequently, the screw 26 is placed to pass through the pass hole 74a and threadably attached to the screw hole 27, and the boss 28 is deformed by a force for swaging. With these assembling steps, the optical module 4A is fixedly mounted on the lower case part 2B (i.e., to the case 2). The printed circuit board 8 is fixedly mounted to the board mounting section 22 by use of adhesive.

Upon the optical module 4A and the printed circuit board 8 being mounted on the lower case part 2B, the upper case part 2A is placed on the lower case part 2B, and the screws 24 are disposed to pass through the pass holes 23 and threadably attached to the thread holes 25. With this, the assembling of the optical connector 1 is completed.

During the process of assembling the optical connector 1, there is a risk of the optical cable 52 being pulled in the removal direction. There is also a risk of the optical cable 52 being pulled when the optical connector 1 is to be removed from an electronic apparatus. In the case of the optical cable 52 being pulled, the pulling force causes the MT ferrule 5 to be urged in the removal direction.

It may be noted that the back face of the MT ferrule 5 is in contact with the engaging sections 76. The rigidity of the engaging sections in the face-to-face-contact direction is higher than rigidity in any other directions. Further, the direction in which the MT ferrule 5 is urged by the pulling force is in agreement with the direction in which the engaging sections 76 have the higher rigidity. The engaging sections 76 thus prevent the lens ferrule 6 from moving in the removal direction even in the case of the optical cable 52 being pulled.

In the optical module 4A of the present embodiment and the optical connector 1 utilizing such an optical module 4A, the MT ferrule 5 and the lens ferrule 6 maintain satisfactory optical coupling even in the case of the optical cable 52 being pulled. The optical module 4A and the optical connector 1 utilizing the same thus have the improved reliability.

The optical connector 1 of the present embodiment has the mounting sections 74 and 75 formed on both lateral sides of the base 71 that are fixedly mounted to the lower case part 2B upon the optical module 4A being fixedly mounted to the case 2. Fixedly mounting the mounting sections 74 and 75 to the case 2 may cause stress to be applied to the mounting sections 74 and 75.

The positions of the mounting sections 74 and 75 are distanced from the positions of the spring sections 72A, so that stresses generated by tightening the screw 26 and swaging the boss 28 do not affect the spring sections 72A. The spring sections 72A thus reliably urge the lens ferrule 6 against the MT ferrule 5, thereby achieving reliable optical couplings.

Figure 6A:
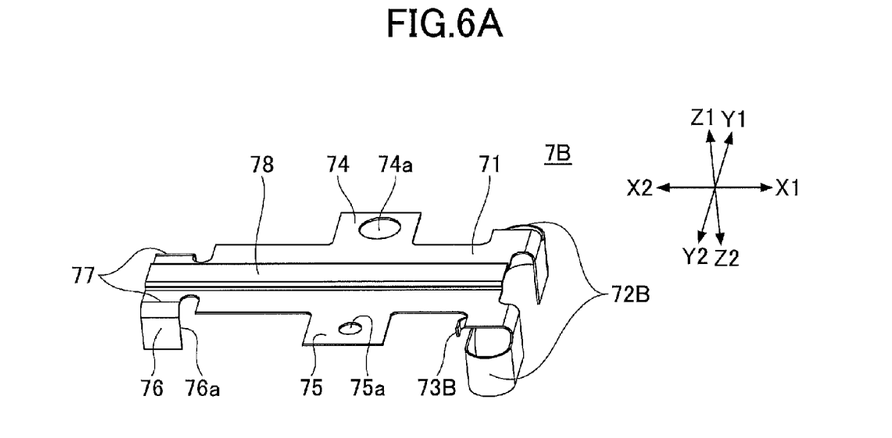
FIGS. 6A and 6B are perspective views of a variation of the ferrule clip.
Figure 6B:
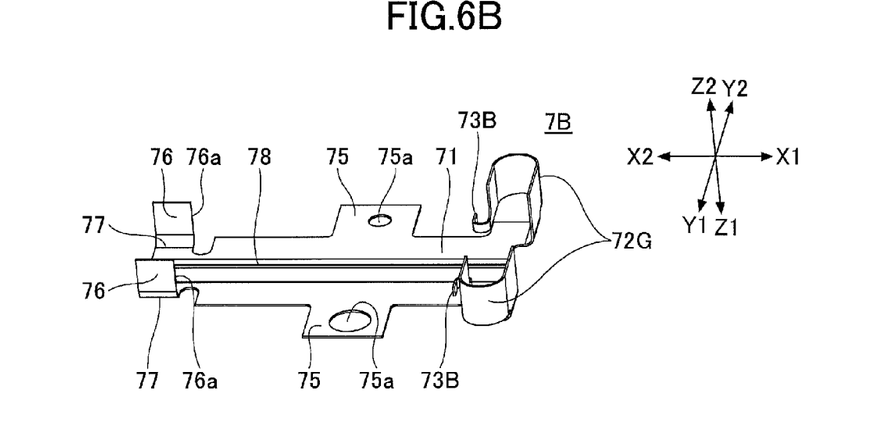

FIGS. 6A and 6B are drawings illustrating a variation of the ferrule clip. In FIG. 6, the same or corresponding elements as those of FIGS. 1 through 5 are referred to by the same numerals, and a description thereof will be omitted as appropriate.

In the case of the ferrule clip 7A illustrated in FIGS. 3A and 3B, the pressure portions 73A formed at the tips of the spring sections 72A extend in the removal direction from the tips of the spring sections 72A. In contrast, pressure portions 73B in this variation have a letter-U shape extending from the tips of spring sections 72B. The letter-U shape of the pressure portions 73B as in this variation provides the pressure portions 73B with spring property.

In the following, a description will be given of another embodiment of the optical module by referring to FIG. 7 through FIG. 9.

Figure 7:
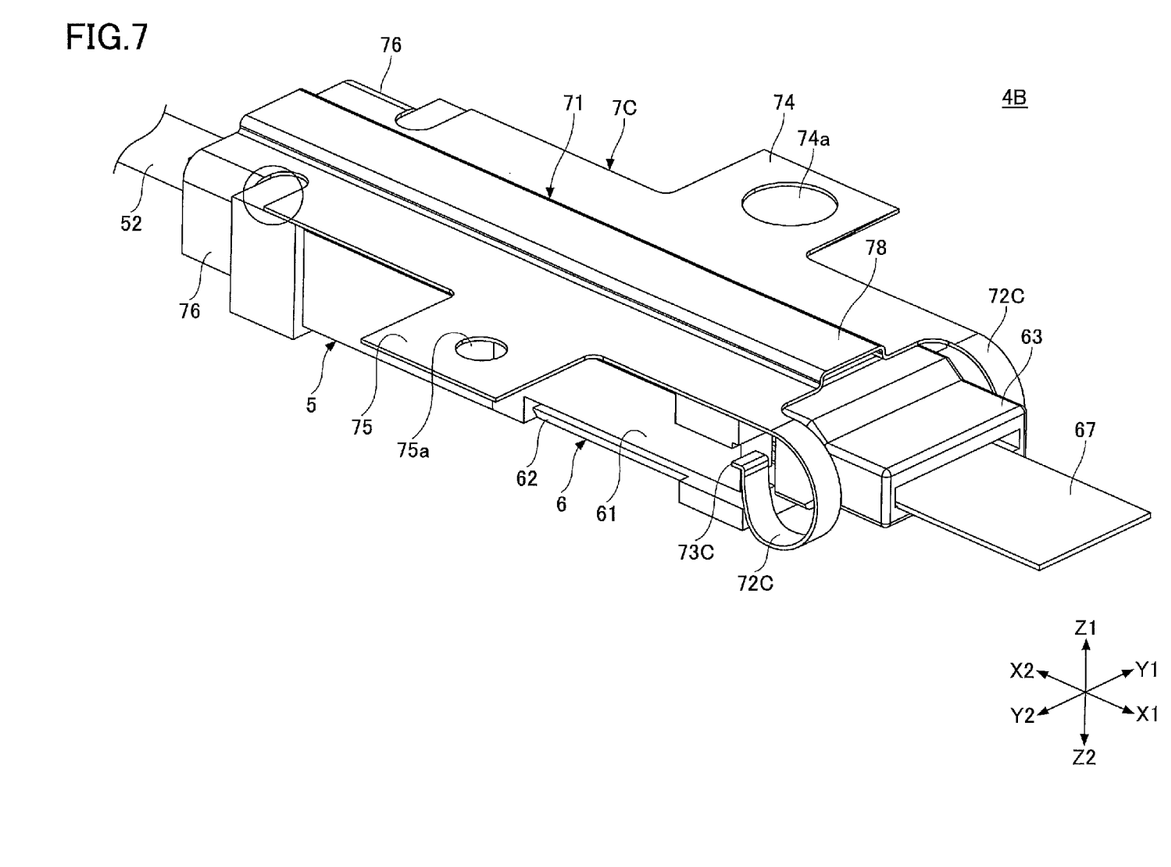
FIG. 7 is a perspective view of an optical module according to a further embodiment.

FIG. 7 is a perspective view of an optical module 4B. FIGS. 8A and 8B are perspective views of a ferrule clip 7C used in the optical module 4B. FIG. 9 is a perspective view of the optical module 4B mounted on the lower case part 2B. In FIG. 7 through FIG. 9, the same or corresponding elements as those of FIGS. 1 through 5 are referred to by the same numerals, and a description thereof will be omitted as appropriate.

The optical module 45 has spring sections 72C of the ferrule clip 7C that are formed into a substantially letter-C shape. The spring sections 72C extend from the end of the ferrule clip 7C facing in the insertion direction, and extend in the vertical direction (i.e., Z1-Z2 direction). The height of the spring sections 72C and the engaging sections 76 is the same as, or shorter than, the height of each of the ferrules 5 and 6.

Consequently, the height of the optical module 4B is substantially the same as the height of each of the ferrules 5 and 6, which contributes to the thinning of the optical module 4B.

The pressure portions 73C formed at the tips of the spring sections 72C extend in the removal direction from the tips of the spring sections 72C, respectively. In the present embodiment, the pressure portions 73C are configured such as to come in contact with only the ferrule base 61 of the lens ferrule 6 without coming in contact with the ferrule cover 62.

Figure 8A:
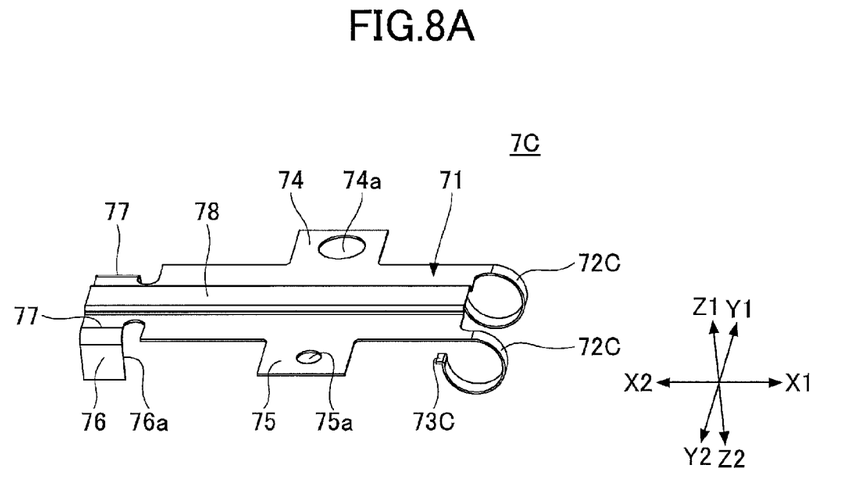
Figure 8B:
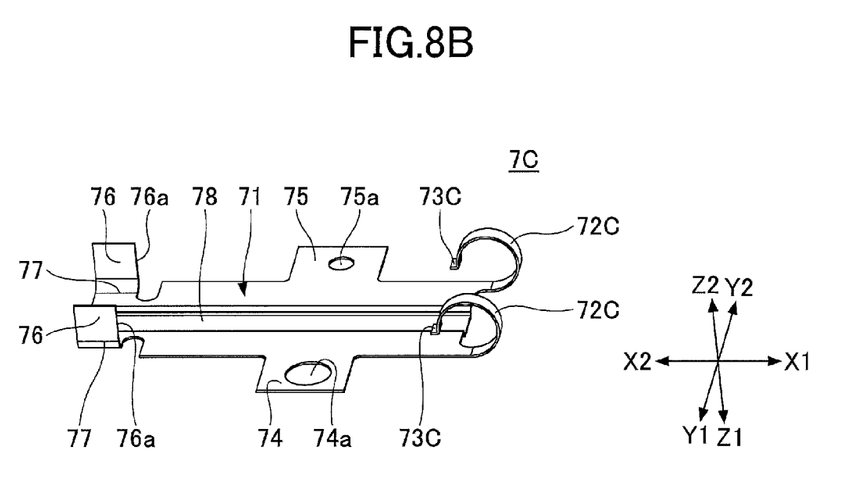
Figure 9:
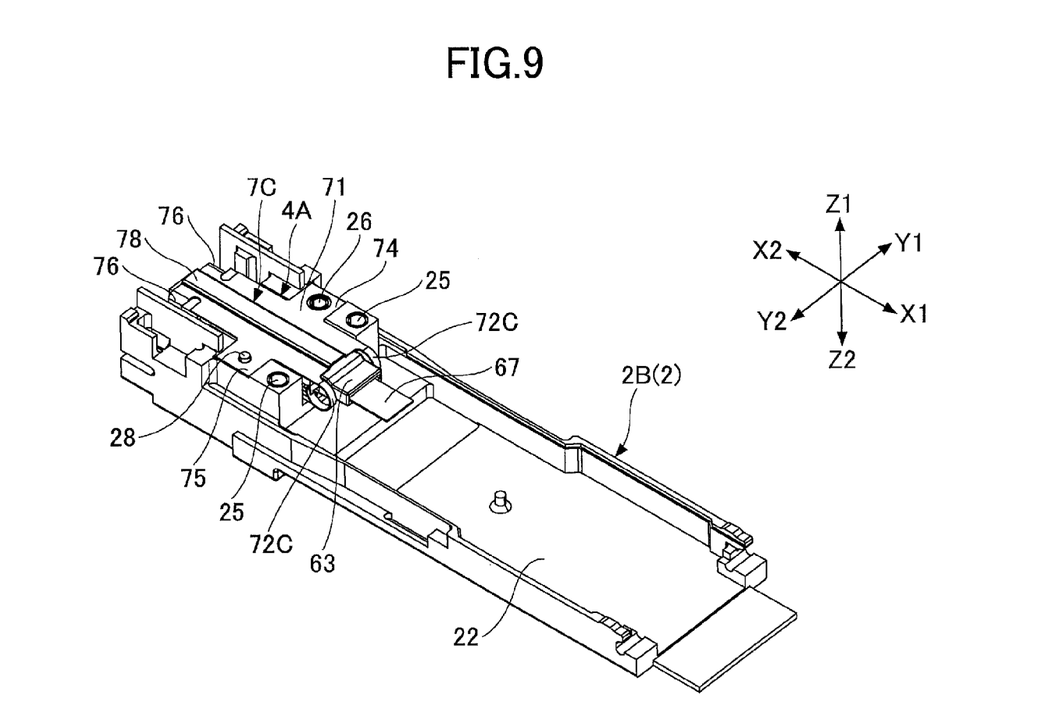
FIG. 9 is a perspective view of the optical module of the further embodiment attached to a lower case part.

FIGS. 10A and 10B through FIGS. 13A and 13B illustrate variations of the ferrule clip 7C illustrated in FIGS. 8A and 8B. In FIGS. 10A and 10B through FIGS. 13A and 13B, the same or corresponding elements as those of FIGS. 1 through 5 are referred to by the same numerals, and a description thereof will be omitted as appropriate. FIGS. 10A and 10B through FIGS. 13A and 13B are perspective views of ferrule clips 7D through 7G, respectively.

Figure 10A:
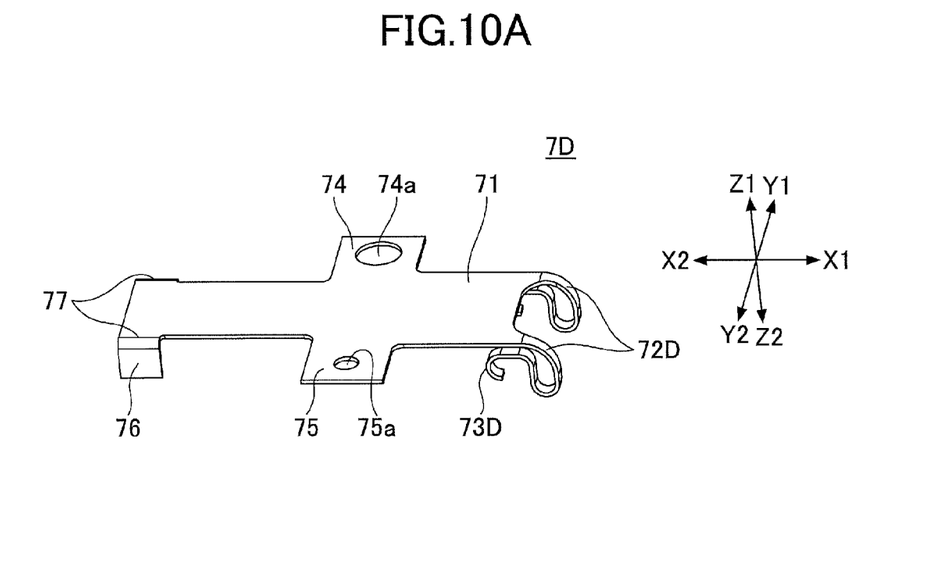
FIGS. 10A and 10B are perspective views of a first variation of the ferrule clip.
Figure 10B:
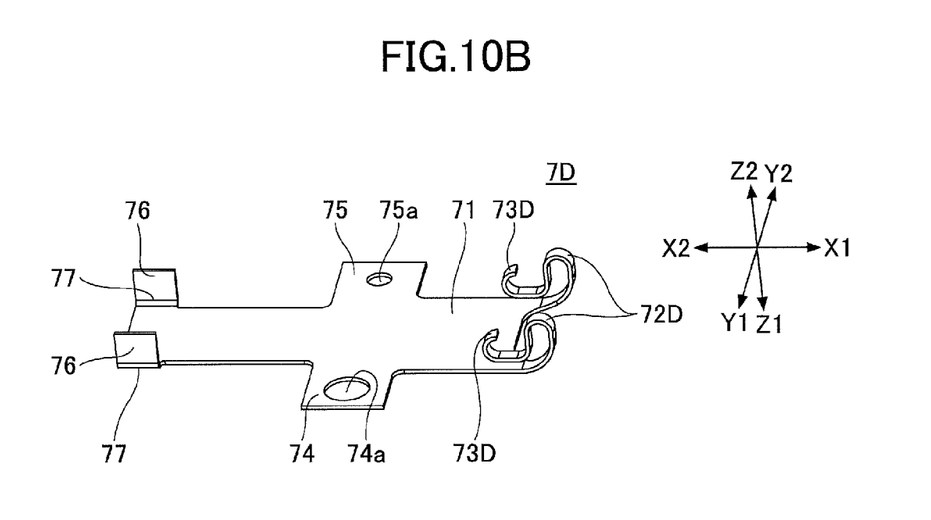

A ferrule clip 7D illustrated in FIGS. 10A and 10B has spring sections 72D that are formed into a substantially letter-S shape. The ferrule clip 7D does not have a reinforcement section. In the case of the base 71 having sufficient rigidity without a reinforcement section, a reinforcement section does not have to be provided. Similarly, the ferrule clips 7E through 7G do not have to have a reinforcement section.

Figure 11A:
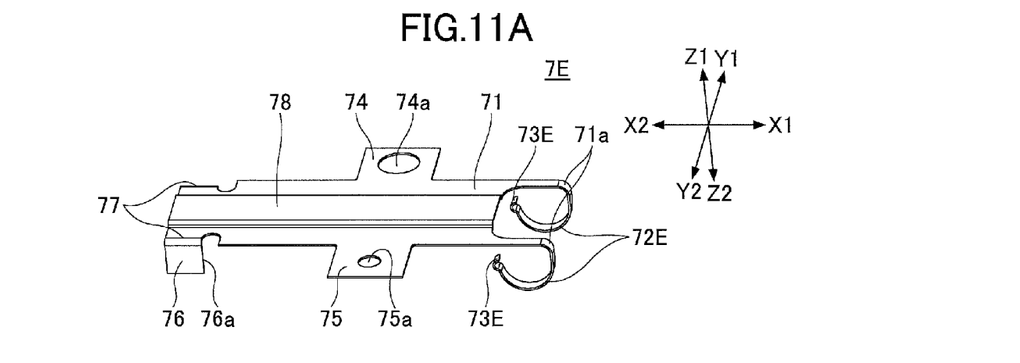
FIGS. 11A through 11C are perspective views of a second variation of the ferrule clip.
Figure 11B:
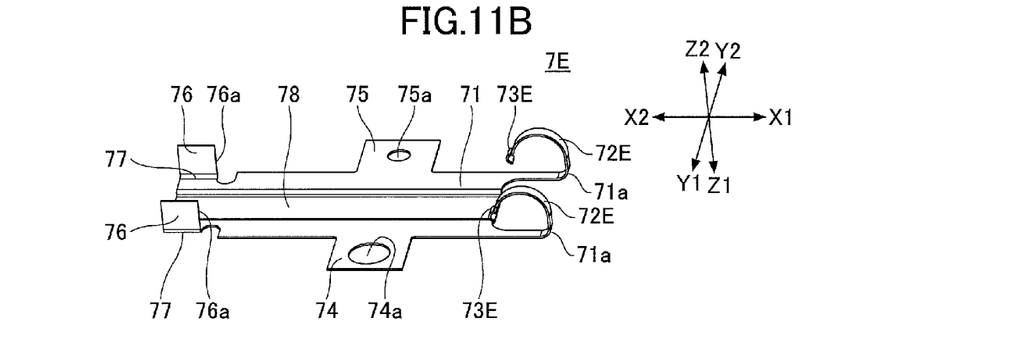
Figure 11C:
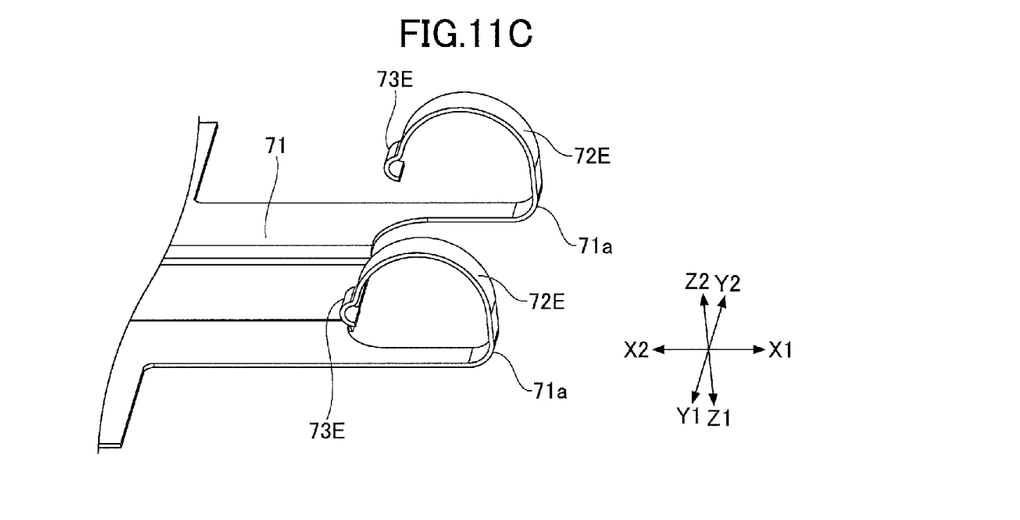

The ferrule clip 7E illustrated in FIGS. 11A and 11B has pressure portions 73E that are small semicircular arc parts formed at the tips of the spring sections 72E, respectively. FIG. 11C is a perspective view illustrating an enlarged view of the pressure portions 73E. The spring sections 72E extend further in the insertion direction than the ends 71a of the base 71 facing in the insertion direction.

Figure 12A:
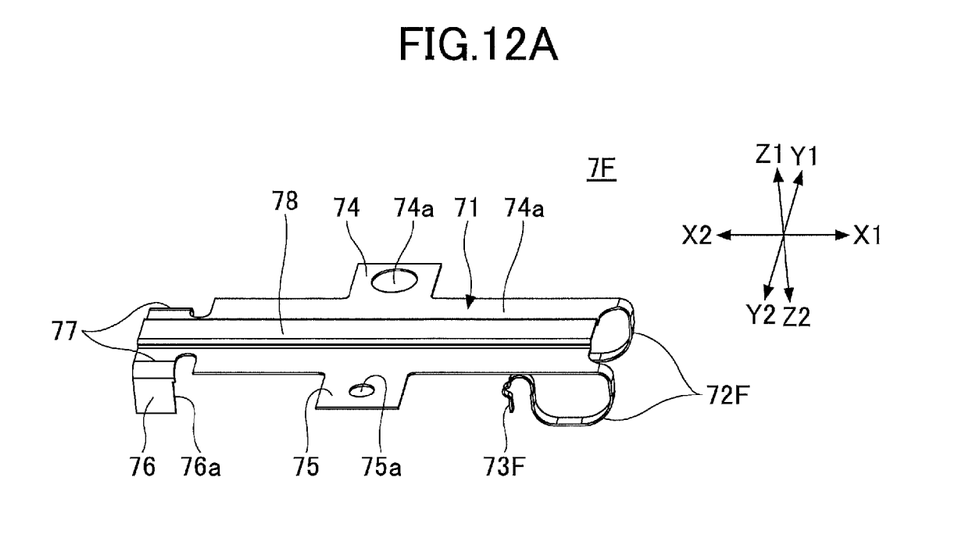
FIGS. 12A and 12B are perspective views of a third variation of the ferrule clip.
Figure 12B:
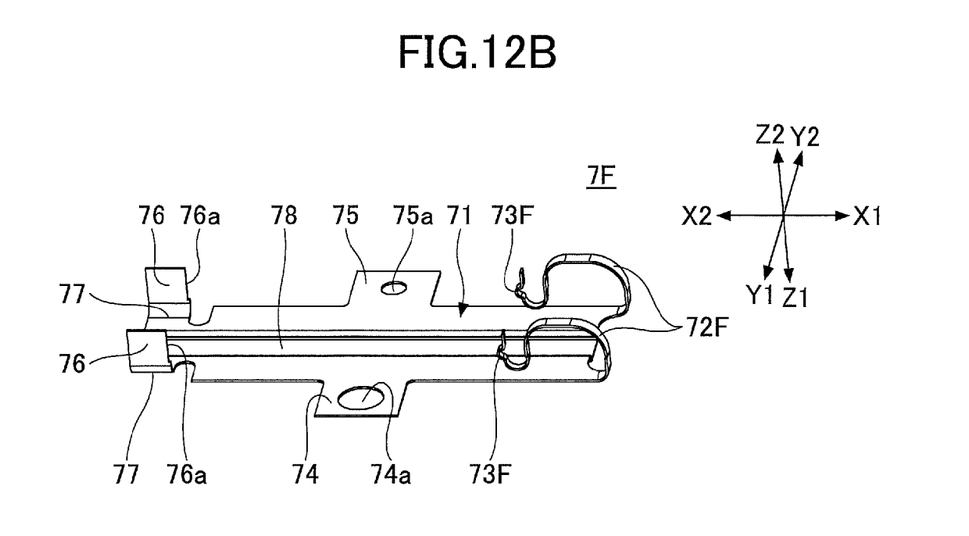

The ferrule clip 7F illustrated in FIGS. 12A and 12B has spring sections 72F formed in a substantially letter-S shape, and has pressure portions 73F that are small semicircular arc parts formed at the tips of the spring sections 72F, respectively. Further, the spring sections 72F extend toward the general center of the base 71 (i.e., in the X2 direction).

Figure 13A:
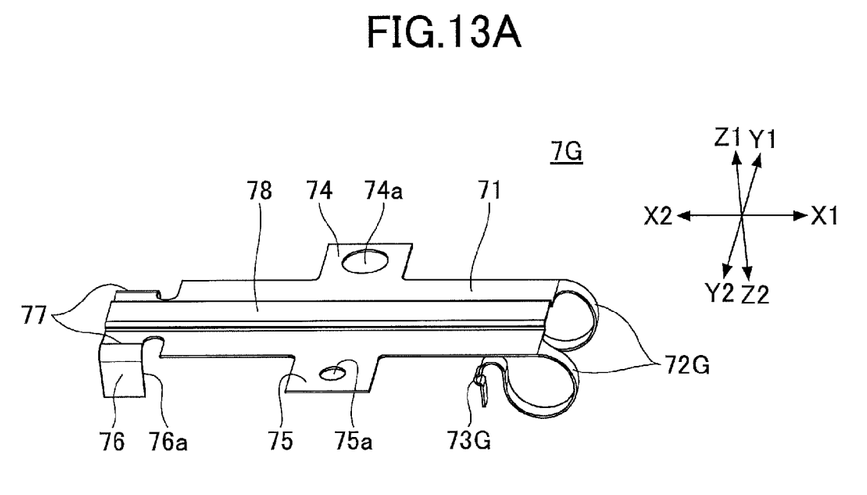
FIGS. 13A and 13B are perspective views of a fourth variation of the ferrule clip.
Figure 13B:
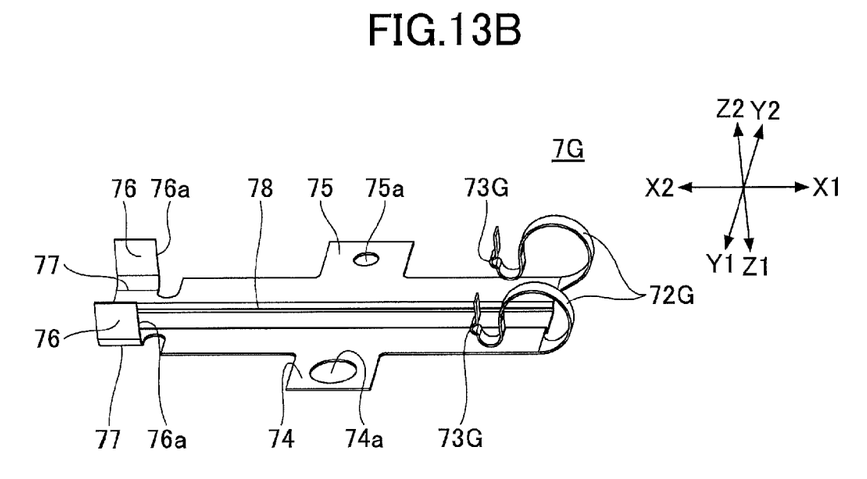

The ferrule clip 7G illustrated in FIGS. 13A and 13B has spring sections 72G formed in a substantially letter-S shape, and has pressure portions 73G that are small semicircular arc parts formed at the tips of the spring sections 72G, respectively. The positions of the pressure portions 73G are closer to the end of the base 71 facing in the insertion direction than the positions of the pressure portions 73F of the ferrule clip 7F illustrated in FIGS. 12A and 12B.

Further, the present invention is not limited to these embodiments, but various variations and modifications may be made without departing from the scope of the present invention.

For example, the embodiments and variations thereof described heretofore have been direction to examples in which each of the ferrule clips are formed of a metal strip having spring property. A ferrule clip is not necessarily formed of metal in its entirety, and may have a structure including metal and resin parts or a structure formed solely of resin.

The present application is based on Japanese priority application No. 2014-201657 filed on Sep. 30, 2014, with the Japanese Patent Office, the entire contents of which are hereby incorporated by reference.

What is claimed is:

1. A clip for keeping a first ferrule and a second ferrule in contact with each other, comprising:
   a base member;
   one or more spring sections formed on the base member and configured to apply an elastic force to the first ferrule in a contact direction in which the first ferrule and the second ferrule come in contact with each other; and
   one or more engaging sections formed on the base member and configured to have higher rigidity in the contact direction than in other directions,
   wherein the engaging sections are configured to engage with the second ferrule, and
   wherein the base member, the one or more spring sections, and the one or more engaging sections together constitute a unitary, seamless structure.

2. The clip as claimed in claim 1, wherein each of the one or more engaging sections is a seamless part of the base member that is bent perpendicularly at a fold line extending parallel to the contact direction, and a side edge of the seamless part is configured to engage with the second ferrule.

3. The clip as claimed in claim 1, wherein the base member has a reinforcement section that suppresses warping of the base member.

4. The clip as claimed in claim 1, wherein the spring sections and the engaging sections have height that is shorter than or equal to a height of the first ferrule and a height of the second ferrule.

5. An optical module, comprising:
   a first ferrule;
   a second ferrule; and
   a clip configured to keep the first ferrule and the second ferrule in contact with each other, wherein the clip includes:
   a base member;
   one or more spring sections formed on the base member and configured to apply an elastic force to the first ferrule in a contact direction in which the first ferrule and the second ferrule come in contact with each other; and one or more engaging sections formed on the base member and configured to have higher rigidity in the contact direction than in other directions, wherein the one or more engaging sections are configured to engage with a first face of the second ferrule that is situated on an opposite side to a second face of the second ferrule, the second face coming in contact with the first ferrule.

6. The optical module as claimed in claim 5, wherein the first ferrule is configured to receive optical waveguides therein that extend in the contact direction and that project from an end of the first ferrule opposite from the second ferrule, and wherein second ferrule is configured to receive optical fibers therein that extends in the contact direction and that project from an end of the second ferrule opposite from the first ferrule.

7. A connector, comprising:

a case; and an optical module disposed in the case, wherein the optical module includes:

a first ferrule;

a second ferrule that comes into contact with the first ferrule; and a clip configured to clip and keep the first ferrule and the second ferrule in contact with each other, the clip being fixed to the case, wherein the clip includes:

a base member;

a spring section formed on the base member and configured to apply an elastic force to the first ferrule in a contact direction in which the first ferrule and the second ferrule come in contact with each other for biasing the first ferrule toward the second ferrule; and an engaging section formed on the base member and configured to have higher rigidity in the contact direction than in other directions, wherein the engaging section is configured to engage with the second ferrule.

8. The connector as claimed in claim 7, further comprising a cable connected to the second ferrule.

9. The connector as claimed in claim 7, further comprising:

an electrical terminal configured to be electrically connected with a terminal of the outer connector;

an optical waveguide connected to the first ferrule; and a transformer provided between the electrical terminal and the optical waveguide for performing transformation between electrical signal and optical signal.

10. The connector as claimed in claim 7, wherein the engaging section engages with a surface of the second ferrule opposite to a surface that comes in contact with the first ferrule.

* * * * *